United States Patent [19]

Huebbel

[11] Patent Number: 5,925,247
[45] Date of Patent: Jul. 20, 1999

[54] CARRIER DISC AND MEMBRANE CUSHION FOR FILTRATION AND SEPARATION

[75] Inventor: Hans-Ulrich Huebbel, Frechen, Germany

[73] Assignee: MFT Membran-Filtrations-Technik GmbH, Cologne, Germany

[21] Appl. No.: 08/849,110

[22] PCT Filed: Sep. 4, 1996

[86] PCT No.: PCT/EP96/03868

§ 371 Date: May 28, 1997

§ 102(e) Date: May 28, 1997

[87] PCT Pub. No.: WO97/12664

PCT Pub. Date: Apr. 10, 1997

[30] Foreign Application Priority Data

Oct. 2, 1995 [DE] Germany .......................... 195 36 560

[51] Int. Cl.[6] .................................................. B01D 63/00
[52] U.S. Cl. ................... 210/321.75; 210/231; 210/232; 210/450; 210/433.1; 210/346; 210/321.63
[58] Field of Search ........................ 210/321.75, 321.54, 210/231, 232, 346, 456, 450, 433.1, 486, 321.633, 321.78

[56] References Cited

U.S. PATENT DOCUMENTS

| | | | |
|---|---|---|---|
| 4,613,436 | 9/1986 | Wight et al. ............................ | 210/232 |
| 4,639,317 | 1/1987 | Luoma, II et al. ..................... | 210/456 |
| 4,892,657 | 1/1990 | Mohn et al. ........................ | 210/321.84 |
| 5,232,589 | 8/1993 | Kopf .................................. | 210/321.84 |
| 5,679,249 | 10/1997 | Fendya et al. ..................... | 210/321.84 |

*Primary Examiner*—Ana Fortuna
*Attorney, Agent, or Firm*—Diller, Ramik & Wight, PC

[57] ABSTRACT

Membrane element consisting of carrier disk and membrane cushion for filtering and separating flowing media, especially in devices for filtering and separating fluids by membrane techniques. Aim of the membrane element according to the invention is the essential reduction of the losses of pressure inherent to the modules by eliminating the sharp redirections of the flow by the usual carrier disks and membrane cushions in plate modules. This is achieved by a circular guidance of the flow of the fluid to be separated between carrier disk and membrane cushion. The carrier disk according to the invention is provided with a slit-like passage so that, after a concentric, circular flow over the carrier disk and the corresponding membrane cushion, a guidance of the flow to the next carrier plate level with the correspondingly formed membrane cushion is made possible with minimal loss of pressure and almost without redirections. Carrier plate and membrane cushion are used for filtering and separating fluids in plate modules.

29 Claims, 5 Drawing Sheets

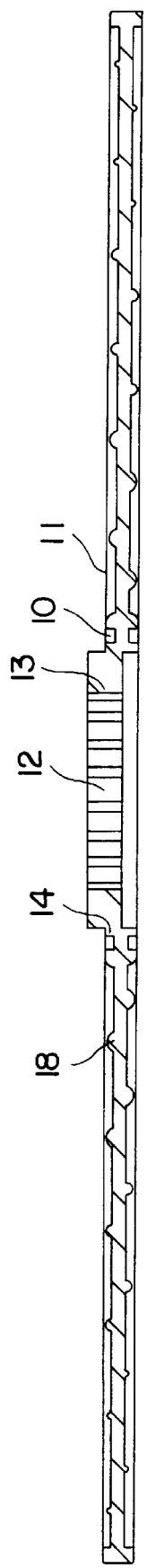
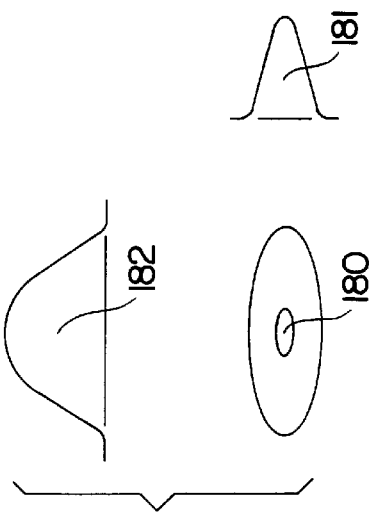
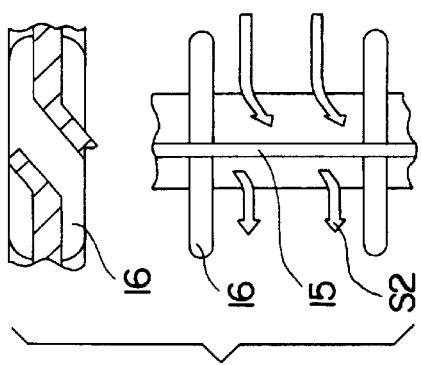

CARRIER DISC AND MEMBRANE CUSHION FOR FILTRATION AND SEPARATION

The disclosed invention refers to a carrier disk for guiding a flow, and a membrane cushion as a device for filtering and separating fluids by the use of reversed osmosis, nanofiltration, ultrafiltration or microfiltration membranes, wherein membrane cushions and carrier disks are arranged alternately such that the fluid to be treated flows on both sides across the membrane, the carrier disk sufficiently guides and swirls the fluid by means of its flow elements and leads it to the next disk level without substantial loss of pressure.

Carrier disks and membrane cushions form part of a device which, as a module, consists of the carrier disks, the membrane cushions, stack terminal plates, draw plates, packing sheets and/or terminal flanges and a cylindrical pressure tube. Within complete installations with a wide range of pumps, prefiltrations, purification devices and control units, these module elements are employed, singly or multiply, as filter installations for fluid media.

Module elements for the separation and filtration of fluids of similar nature are prior art and known by a wide range of patents. The described novel membrane elements are a new development of carrier disks and membrane cushions of a plate module. Plate modules have in common that they consist of flow, sealing or shut-off plates, sealings, flanges, draw plates and pressure bodies of very different kinds and dimensions.

A special problem is the fact that, in all plate modules, a relatively high loss of pressure takes place within the module. It is the goal of the development to reduce substantially this pressure, respectively the pressure gradient, across the module. This is especially important as a reduction in the loss of pressure in the module can reduce considerably the amount of electrical energy to be allocated and brings about considerable changes in circuitry possibilities (connections in series, transfer trees). Especially in applications in sewage or product recycling techniques, where it is important to limit the amount of concentrate, in general to the lowest possible volume, considerable advantages in investment and operational costs are the result. These advantages are even increased in the case of high-pressure techniques in membrane technology, which are especially energy-intensive.

In the areas of nanofiltration, ultrafiltration and microfiltration, in which the plate modules of prior art could not be employed because of high losses of pressure inherent to the modules, the present invention opens up a new field of application.

It has been achieved by the fundamentally novel circular flow guidance of the present invention, especially between the carrier disks and the membrane cushions, as well as by the selected flow guiding elements on the carrier disks, to reduce the losses of pressure compared to the usual modules by more than 50%, thus increasing the efficiency of the application as well as extending its operative range.

SUMMARY OF THE INVENTION

According to the invention, these problems are solved by the fact that shape and form of the carrier disk, especially the ramp-like flow guidance from one carrier disk to the next, lead to a circular flow over the membrane cushion. This is achieved by a generally radial slit-like passage guiding the flow from one carrier disk to the next like a ramp. That is how a typical problem of other plate module systems is avoided, namely a recurring sharp redirection of the flow by 180°, which is primarily responsible for the loss of pressure.

In other plate module systems, the fluid medium is redirected by 180° and guided to the next level at least once per plate module carrier disk.

The advantage of the carrier disk according to the invention generally consists in that the fluid flows over the area of both sides of the membrane cushion without resistance and is not guided from plate module carrier level to carrier level in a sharp or other 180° flow redirection to the next membrane cushion, but is guided, at the end of a circuit by means of a ramp-like structure without substantial change of direction of the flow, to the next membrane cushion, where it continues flowing over both sides of the next membrane cushion.

The invention will now be described with reference to the accompanying drawings.

BRIEF DESCRIPTION OF THE DRAWINGS

FIG. 2: Cross section B—B of carrier disk (increased scale)

FIG. 3: Detail A: slit-like passage (increased scale)

FIG. 4: Detail C: structure of flow elements (increased scale)

DESCRIPTION OF THE PREFERRED EMBODIMENT

Figure 7:
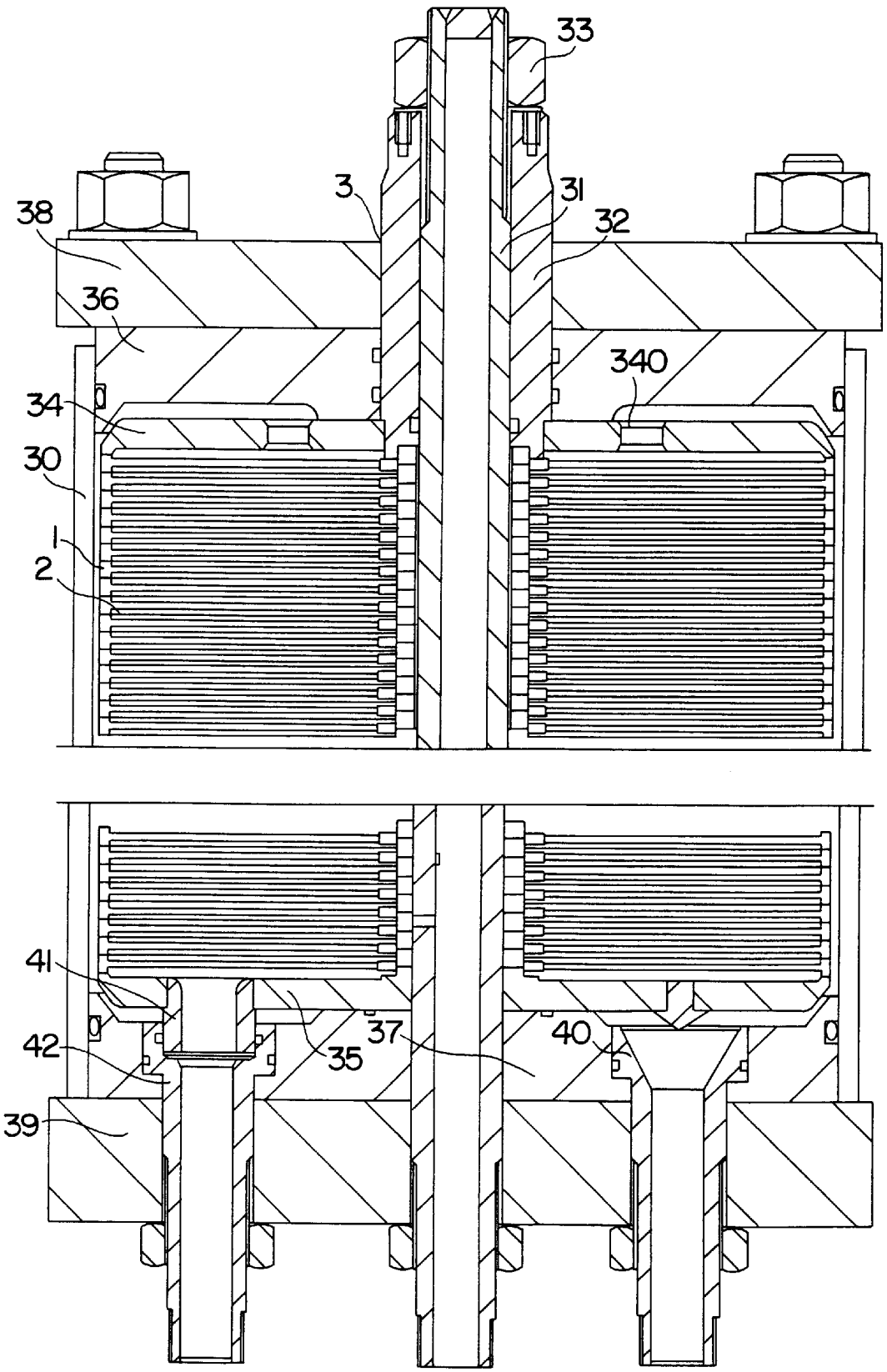
FIG. 7: Device as cross-sectional overall representation of a plate module

The plate module (3), the described device for reversed osmosis, nanofiltration, ultrafiltration and microfiltration, are represented cross-sectionally in FIG. 7 and will at first be described in order to achieve a better understanding of the overall connections. The plate module consists of a tube-like pressure housing (30) sealed to the outside across the upper and lower flow redirection disks (36, 37) as well as the upper and lower terminal flanges (38, 39). In the module the carrier disks (1) and the membrane cushions (2) are clamped together via the central tie rod (31) and the upper and lower stack terminal plates (34, 35). The bias is applied by the tension nut (33), the bias force being transmitted by the clamping sleeve (32).

The module (3) operates as follows: via the untreated water inlet (40) the fluid enters the module, flows past the element stack and gets through the passages (340) of the upper stack terminal plate (34) to the first carrier disk (1). It flows over this carrier disk in a circular way and is then guided through a slit-like passage (15) to the next carrier disk below and the corresponding spaced membrane cushion. Untreated water flows over both the upper and the lower side of the membrane cushion (2). After a circuit, the ramp-like redirection to the next level takes place. In this manner, the fluid flows through the entire element stack of the module. The decisive advantage of this manner of flowing is the fact that the flow is very regular, without sharp directional changes. The entering volume flow encounters a permanently constant cross-sectional flow area, so that no changes in velocity of flow arise. The design of the slit-like passages (15) is such that the velocity of flow is kept constant here as well. While flowing over the membrane cushion, a fraction of the substance flow permeates through the membrane layer (201, 202) into the interior part towards the permeate spacer (200). This so-called permeate is guided along the central tie rod (31) and in the interior thereof down towards the permeate collecting tube. The remaining part of the untreated water (concentrate) leaves the module via concentrate sleeve (41) and concentrate nozzle (42).

Figure 1:
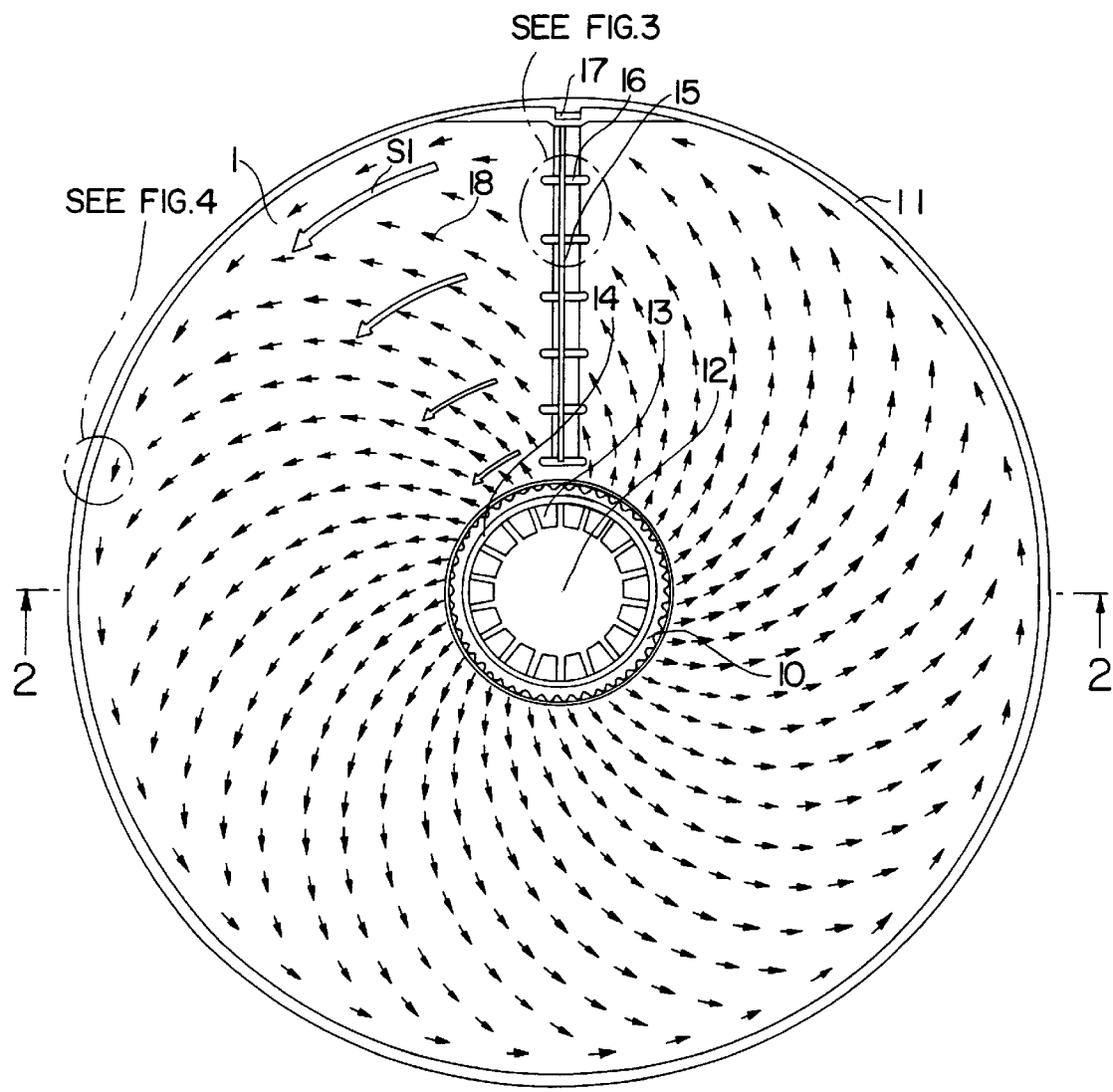
FIG. 1: Top view of carrier disk

FIG. 1 shows the carrier disk (1) according to the invention in a top view, and FIG. 2 in the cross section B—B. The carrier disk generally forms a disk-shaped circular body having at its outer side a circular rim (11) and a plurality of projections (13) in the center around a central hole (12) with respective spaces towards the central hole. The projections (13) are pitched evenly around the central hole. The projections (13) border on a centering rim (14) and an o-ring groove (10) provided to receive a sealing element (o-ring) sealing the untreated water side from the permeate side. A slit-like passage (15) extends radially from the central area towards the outer rim, by means of which passage the fluid flows from one carrier disk level to the next carrier disk level after concentrically flowing over (S1) the carrier disk and the membrane cushion. This is achieved by the passage having along the radial extension thereof bent ramp planes engaging each other if the carrier disks are being stacked, such that a redirection of the fluid from one carrier disk level to the next one takes place. The slit-like passage (15) comprises a plurality of protrusions (16) for guiding the flow and for supporting and locking into place the membranes. At the outer rim of the passage, there is a warp safety device (17) protecting both the membranes and the carrier place against each other from being warped. There are flow elements (18) on the carrier disk for directing and controlling the flow, which are represented in enlarged form in FIG. 4. Besides controlling the flow, the flow elements also have the function to space the membrane cushions from the carrier disk.

The flow elements (18) represented in FIG. 4 have an oval outline. This results in a broad side (182) and a narrow side (181). The arrangement of the elements on the carrier disk (1) has been chosen as follows: arranged in concentric circles around the central hole (12), there always is the same number of flow elements (18), the orientation towards the main flow being different. On the short and therefore preferred interior lanes, the flow encounters a lot of resistance by the broad side (182) of the flow element, on the long and therefore disadvantaged outer lanes, the flow encounters little resistance by the narrow side (181) of the element. In between, the flow elements are more or less bent in a correspondingly proportionate manner. The result is an even distribution of the velocity across the entire cross-sectional flow area across carrier disk (1) and membrane cushion (2). The tip (180) of the flow element (18) has a rounded shape in order not to damage the delicate membrane cushion (2) when touching it. Apart from that, the flow element (18) has the desired characteristic to swirl the flowing medium, thus creating a turbulence useful for the separating performance of the membrane.

FIG. 2 shows the cross section B—B of the carrier disk (1). From the central axis represented by the center of the central hole (12) through which the central tie rod (31) of the module is guided, the carrier disk comprises the projections (13) described above. The projections are displaced upwards by 50% with respect to the center of the carrier disk so that an accurately fitting stacking of the carrier disks, including the membrane cushions arranged in between, is made possible.

FIG. 3 shows in detail the slit-like passage (15) including protrusions (16) for locking the membrane cushions into place. The ramp-like design is achieved by forming two bent ramp planes at a slit-like passage in the carrier disk (1) at a certain angle (between 30° and 60°, preferably 40°). These engage each other if the carrier disks (1) are stacked so that a forced guidance of the flow to the next lower level is predetermined (cf. FIG. 6). Protrusions are provided for locking the membrane cushions into place in the area of the passage. The upper sides of the protrusions are flattened in order to clamp the welding seam of the membrane cushion (21), thus securing it.

As the carrier disks (1) are subject to high bias and operation forces in the module (3), the carrier disks (1) are made of plastic which allows as little flow of the product as possible, which is why a proportion of fabric parts is added in the production process for reinforcement purposes.

Figure 5:
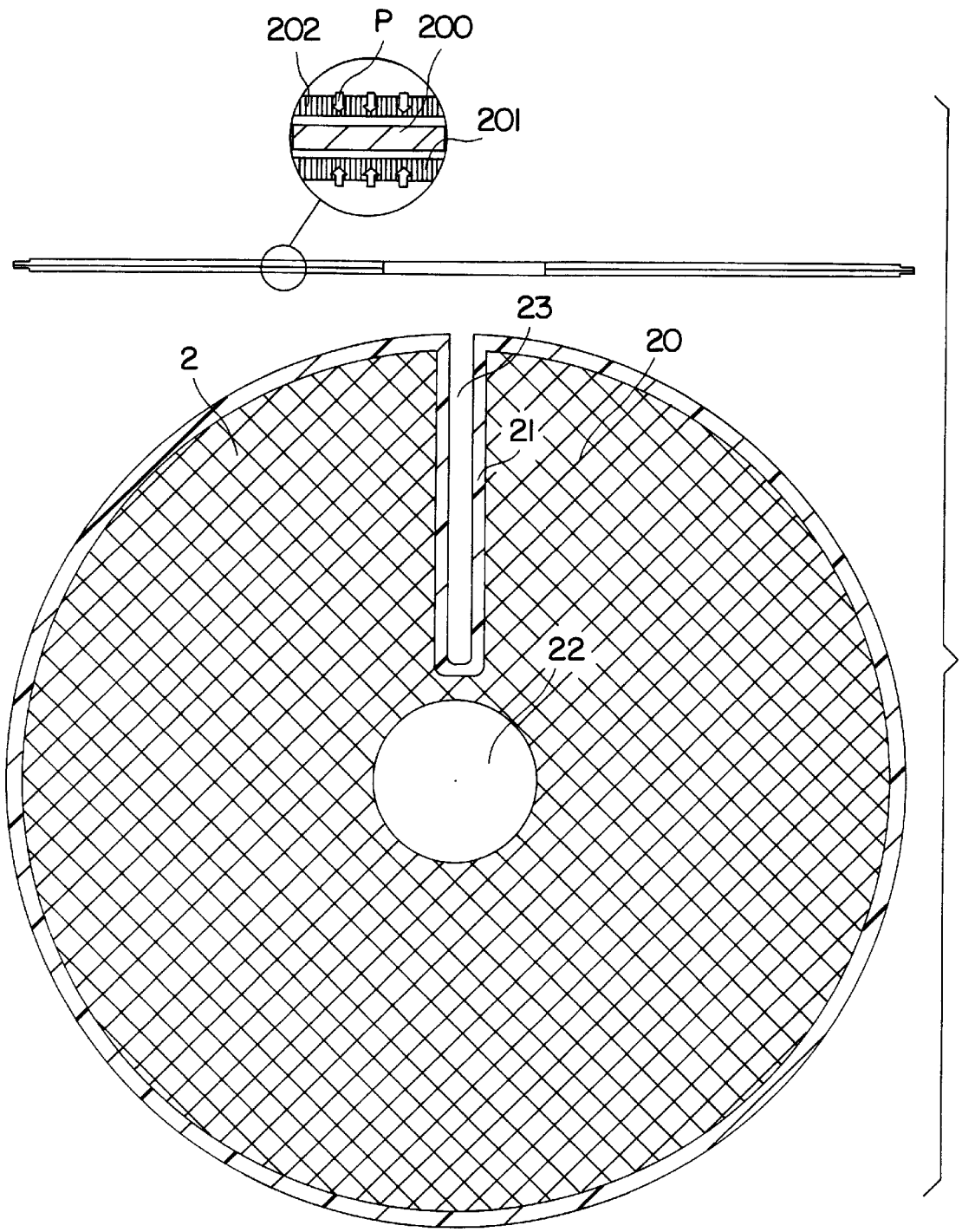
FIG. 5: Top view and cross section of membrane cushion

FIG. 5 shows a top view and a cross-sectional view of the membrane cushion (2). It consists of a total of three layers, the permeate spacer (200) in the center, the lower membrane layer (201) and the upper membrane layer (202). These three layers are welded together in a special process. This welding together causes the so-called permeate collected in the central area of the membrane cushion, respectively in the permeate spacer (200), to be able to escape only towards the center, i.e. the central tie rod, where it is collected and guided away. The membrane area (20) has the characteristic to let pass only a certain fraction of the untreated water (semipermeable membrane). The direction of the permeation (P) is represented in an enlarged scale. The membrane comprises a central hole (22), which is centered on the carrier disk (1) by the projections (13) thereof. Apart from that, the membrane comprises a slit (23) which is to be arranged in accordance with the slit-like passage (15) of the carrier disk (1) when the modules are being stacked.

Figure 6:
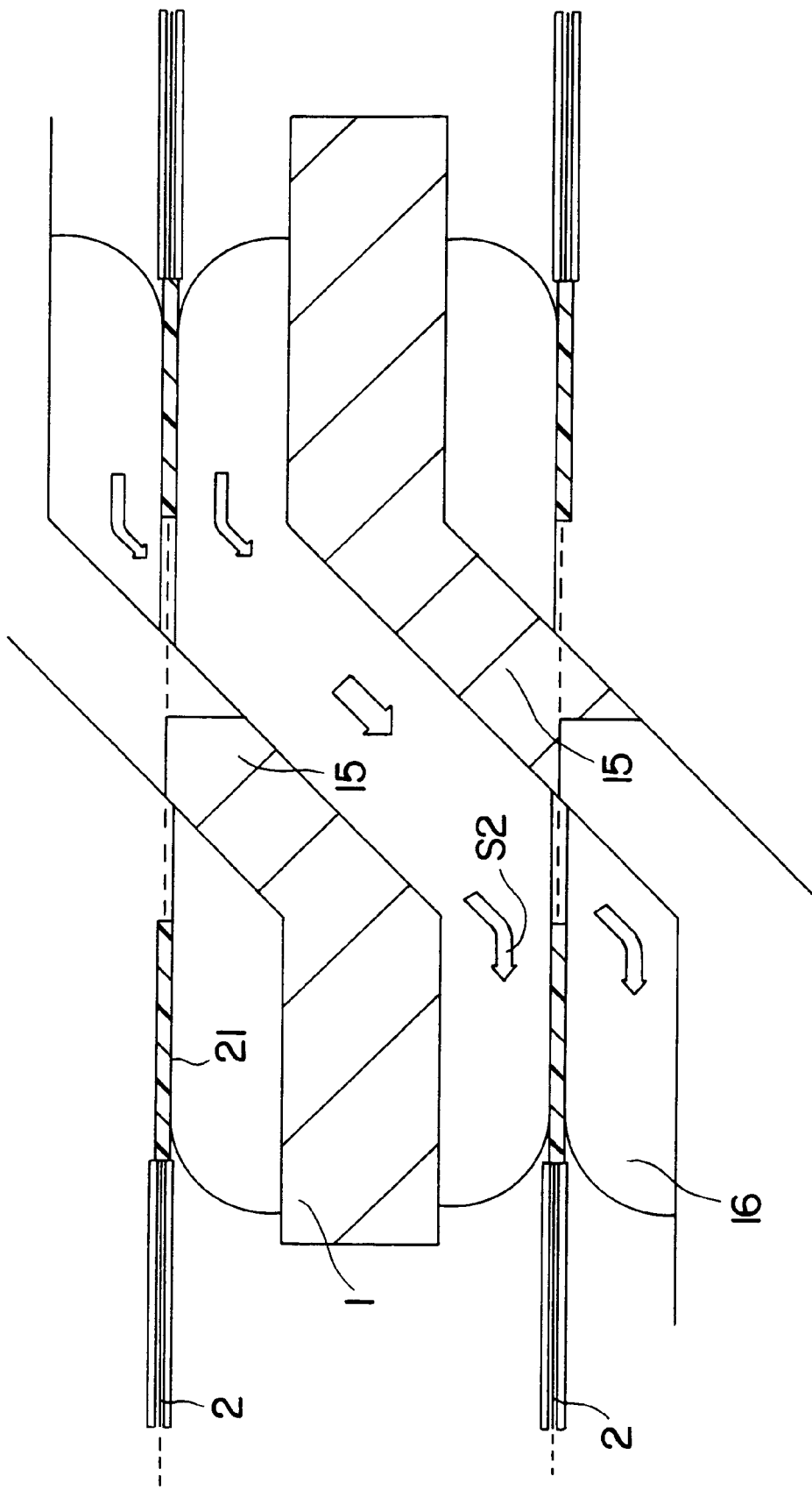
FIG. 6: Sketch of principle of flow guidance, represented over three carrier disks including membrane cushions

FIG. 6 shows a diagrammatic representation of the course of the flow (S2) in the slit-like passage of three stacked carrier disks (1). The membrane cushions (2) are clamped at the welding seams (21) thereof between two protrusions (16) and are thus locked into place. This ensures that about the same amount of flowing medium gets on the upper and the lower side of the membranes.

Although a preferred embodiment of the invention has been specifically illustrated and described herein, it is to be understood that minor variations may be made in the apparatus without departing from the spirit and scope of the invention, as defined the appended claims.

We claim:

1. A membrane stack comprising at least a pair of carrier disks (1) and a membrane cushion (2) positioned therebetween, said carrier disks (1) and membrane cushion define a generally circular flow-over area, each carrier disk (1) includes a substantially radially oriented passage (15) substantially spanning it s flow-over area, said membrane cushion (2) includes a substantially radially oriented slit (23) aligned with said radially oriented passages (15), said carrier disks (1) each including upper and lower radially extending inclined ramps projecting in axially opposite directions, and upper and lower ramps of respective lower and upper carrier disks (1) being in contact with each other to thereby force a diversion of fluid flow between the carrier disks (1) and substantially concentric flow over the membrane cushion (2).

2. The membrane stack as defined in claim 1 including means for clamping said membrane cushion (2) between said carrier disks (1).

3. The membrane stack as defined in claim 2 wherein said ramps define an angle of inclination to a plane of said disks in the range of 30 to 60 degrees.

4. The membrane stack as defined in claim 2 including at least one wall spanning each pas age and thereby defining at least two flow passage portions.

5. The membrane stack as defined in claim 2 including means upon at least one surface of each carrier disk for imparting arcuate fluid flow along said flow-over areas.

6. The membrane stack as defined in claim 2 including means for interlocking said carrier disks together.

7. The membrane stack as defined in claim 2 including an interlocking pin and slot at adjacent peripheral edge portions of said carrier disks for effecting angular relative location therebetween.

8. The membrane stack as defined in claim 2 including a central opening in each carrier disk, an o-ring seal at each opposite side of each carrier disk outboard of the central opening thereof, an annular recess inboard of one o-ring seal, an axial annular projection inboard of another o-ring seal, and said annular projection being seated in said annular recess.

9. The membrane stack as defined in claim 1 including a circular opening (22) in said membrane cushion (2), a portion of said membrane cushion being located between said circular opening and said slit, and means for clamping said membrane cushion portion between said carrier disks.

10. The membrane stack as defined in claim 1 wherein said ramps define an angle of inclination to a plane of said disks in the range of 30 to 60 degrees.

11. The membrane stack as defined in claim 10 including at least one wall spanning each passage and thereby defining at least two flow passage portions.

12. The membrane stack as defined in claim 10 including means upon at least one surface of each carrier disk for imparting arcuate fluid flow along said flow-over areas.

13. The membrane stack as defined in claim 10 including means for interlocking said carrier disks together.

14. The membrane stack as defined in claim 10 including an interlocking pin and slot at adjacent peripheral edge portions of said carrier disks for effecting angular relative location therebetween.

15. The membrane stack as defined in claim 10 including a central opening in each carrier disk, an o-ring seal at each opposite side of each carrier disk outboard of the central opening thereof, an annular recess inboard of one o-ring seal, an axial annular projection inboard of another o-ring seal, and said annular projection being seated in said annular recess.

16. The membrane stack as defined in claim 1 including means spaced radially along said passages for clamping radially spaced edge portions of said membrane cushion between said carrier disks.

17. The membrane stack as defined in claim 1 including at least one wall spanning each passage and thereby defining at least two flow passage portions.

18. The membrane stack as defined in claim 1 including a plurality of protrusions spaced radially along said passages for clamping radially spaced edge portions of said membrane cushion between said carrier disks.

19. The membrane stack as defined in claim 1 including means upon at least one surface of each carrier disk for imparting arcuate fluid flow along said flow-over areas.

20. The membrane stack as defined in claim 1 including means upon at least one surface of each carrier disk for imparting arcuate fluid flow along said flow-over areas, and said arcuate fluid flow imparting means are a plurality of spaced projections spaced from each other and lying upon a substantially common arc.

21. The membrane stack as defined in claim 1 including means upon at least one surface of each carrier disk for imparting arcuate fluid flow along said flow-over areas, said arcuate fluid flow imparting means are a plurality of spaced projections spaced from each other and lying upon a substantially common arc, and each projection is of a generally oval shape.

22. The membrane stack as defined in claim 1 including means upon at least one surface of each carrier disk for imparting arcuate fluid flow along said flow-over areas, said arcuate fluid flow imparting means are a plurality of spaced projections spaced from each other and lying upon a substantially common arc, and each projection is of a generally oval shape with tapered ends.

23. The membrane stack as defined in claim 1 including means upon at least one surface of each carrier disk for imparting arcuate fluid flow along said flow-over areas, said arcuate fluid flow imparting means are a plurality of spaced projections spaced from each other and lying upon a substantially common arc, and each projection is of a generally oval shape with tapered ends and rounded tips.

24. The membrane stack as defined in claim 1 including means for locking said carrier disks together.

25. The membrane stack as defined in claim 1 including means for interlocking said carrier disks together.

26. The membrane stack as defined in claim 1 including means for interlocking said carrier disks together at adjacent peripheral edge portions thereof.

27. The membrane stack as defined in claim 1 including an interlocking pin and slot at adjacent peripheral edge portions of said carrier disks for effecting angular relative location therebetween.

28. The membrane stack as defined in claim 1 including at least one o-ring seal for centrally sealing said carrier disks relative to each other.

29. The membrane stack as defined in claim 1 including a central opening in each carrier disk, an o-ring seal at each opposite side of each carrier disk outboard of the central opening thereof, an annular recess inboard of one o-ring seal, an axial annular projection inboard of another o-ring seal, and said annular projection being seated in said annular recess.

* * * * *